(12) United States Patent
Shibazaki

(10) Patent No.: US 7,868,279 B2
(45) Date of Patent: Jan. 11, 2011

(54) FOCUS DETECTING APPARATUS FOR FOCUSING ON SURFACE OF TRANSPARENT SUBSTANCE

(75) Inventor: Takami Shibazaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 78 days.

(21) Appl. No.: 12/328,243

(22) Filed: Dec. 4, 2008

(65) Prior Publication Data
US 2009/0159777 A1    Jun. 25, 2009

(30) Foreign Application Priority Data
Dec. 7, 2007    (JP) .............................. 2007-316857

(51) Int. Cl.
*G02B 7/04* (2006.01)
(52) U.S. Cl. .................. 250/201.3; 250/201.4; 359/383
(58) Field of Classification Search ............. 250/201.2, 250/201.3, 201.4; 356/609; 359/383
See application file for complete search history.

(56) References Cited
U.S. PATENT DOCUMENTS
2007/0115782 A1*    5/2007   Andersen et al. ......... 369/53.23

FOREIGN PATENT DOCUMENTS
JP    2006-184777    7/2006

\* cited by examiner

*Primary Examiner*—Tony Ko
(74) *Attorney, Agent, or Firm*—Pillsbury Winthrop Shaw Pittman, LLP

(57) ABSTRACT

The focus detecting apparatus comprises an objective lens, a point light source which irradiates illumination light for generating a focusing signal to a transparent substrate through the objective lens, a mask means having a first shading part for shading one of areas of the luminous of the illumination light, and a photodetector having two light receiving parts, wherein the mask means is formed so as to have a shape similar to one of light receiving parts in the photodetector, and has a second shading part that intercepts a part of luminous flux passing through another area so that reflected light from one of the surfaces may enter into the two light receiving parts, and reflected light from another surface may pass through an area which is located off the light receiving part arranged at one of the areas, when a focus of the objective lens is positioned near one of surfaces out of the first or second surface in the transparent substrate.

3 Claims, 4 Drawing Sheets

LUMINOUS FLUX OF
ILLUMINATING LIGHT
ISSUED FROM LIGHT SPOT 17

LUMINOUS FLUX OF
LIGHT REFLECTED
FROM OTHER SURFACE OF
TRANSPARENT SUBSTRATE 4a1

FOCUS DETECTING APPARATUS FOR FOCUSING ON SURFACE OF TRANSPARENT SUBSTANCE

This application claims benefits of Japanese Patent Application No. 2007-316857 filed in Japan on Dec. 7, 2007, the contents of which are hereby incorporated by reference.

BACKGROUND OF THE INVENTION

1. Field of the Invention

The present invention relates to a focus detecting apparatus, particularly, relates to the focus detecting apparatus for performing automatically focusing on a designated surface of transparent substrates, such as a microplate and a slide glass in a microscope observation apparatus.

2. Description of the Related Art

In a field of biotechnology, in order to clarify reactions of various living cells under various conditions, a result of statistics analysis for many cells has been used in many cases frequently. For such purpose, conventionally, an apparatus so called as flow cytometer has been used. However, in recent years, a technique in which a result of the statistics analysis is obtained by acquiring images of many cells by a microscope observation apparatus and analyzing the acquired images has been used.

By the way, in order to examine actually the reaction of the living cell under various conditions, it is necessary to use, as objects of analysis, very many living cells cultured in a container such as a microplate. Accordingly, it is desired that as for a microscope observation apparatus for acquiring an image of a cell, it is constituted so that it may have an inverted microscope type optical arrangement, where observation is carried out from the lower part of a container such as a microplate, and further, a series of operations concerning capture of images such as change of a position of a view field, focusing, image acquisition, etc. is automated.

In automation of a microscope observation apparatus, an automation system for focusing is important particularly. Generally, as for the automation system for focusing, it can be divided roughly into two systems. One of the systems is called as active system in which an object (photographic object) is irradiated by illumination light such as infrared light, etc., and then a focus is detected by detecting an amount of the light, etc. Another system is called as passive system in which a focus is detected using an image captured through a lens.

However, in a microscope observation apparatus which acquires images of cell for investigating and clarifying a reaction of various living cells under various conditions, a focusing system of the active system having quick working speed has been adopted in many cases since it is necessary to acquire many images. As for a focus detecting apparatus that such active system is adopted, it is shown in Publication of the Japanese unexamined patent application, Toku Kai No. 2006-184777, for example.

SUMMARY OF THE INVENTION

The focus detecting apparatus of the present invention is characterized in that it comprises, an objective lens; a point light source which emits illumination light for generating a focusing signal to a transparent substrate, and irradiates it through the objective lens; a mask means having a first shading part for shading luminous flux passing through one of areas when it is divided in a first virtual plane along an optical axis of the illumination light out of the luminous flux of the illumination light; and a photodetector having two light receiving parts symmetrically arranged so as to sandwich a second virtual plane along the optical axis of light reflected by the transparent substrate; for carrying out focusing of the objective lens on the first or second surface of the transparent substrate on the basis of an amount of reflecting light from the transparent substrate detected through the two light receiving parts, respectively, wherein the mask means is formed so as to have a shape similar to one of light receiving parts in the photodetector, and has a second shading part that intercepts a part of luminous flux passing through another area when it is divided on the first virtual plane along the optical axis out of the luminous flux of the illumination light so that reflected light from one of the surfaces may enter into the two light receiving parts, and reflected light from another surface may pass through an area which is located off the light receiving part arranged at the area in one of areas when it is divided at the second virtual plane when a focus of the objective lens is positioned near one of surfaces out of the first or second surface in the transparent substrate.

Further, in the focus detecting apparatus according to the present invention, preferably, a shape of the mask means is variable.

Further, in the focus detecting apparatus according to the present invention, preferably, the first and second shading parts in the mask means are constituted with combination of two sheets of thin strip.

According to the present invention, it is possible to obtain a focus detecting apparatus which has a simpler constitution compared with the conventional focus detecting apparatus, wherein a bad influence owing to reflected light emanated from a surface of a side which is not an object of focusing in a transparent substrate is eliminated, and light that does not become a noise is used effectively for focus detection, and an amount of reflected light emanated from a surface of a side which is an object of focusing in the transparent substrate is detected with high detection sensitivity, and focusing on the surface of the side which is an object of the focusing can be carried out.

These and other features and advantages of the present invention will become apparent from the following detailed description of the preferred embodiments when in conjunction with the accompanying drawings.

DETAILED DESCRIPTION OF THE PREFERRED EMBODIMENTS

Hereafter, embodiments of the present invention will be explained in detail using drawings.

Figure 1:
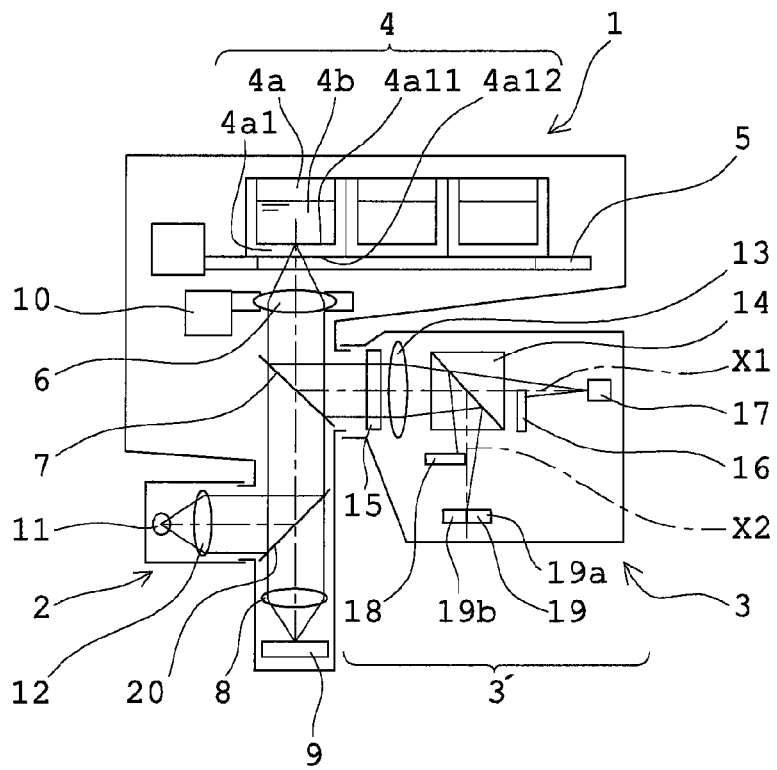
FIG. 1 is an explanatory diagram showing an outlined constitution of a microscope observation apparatus equipped with a focus detecting apparatus of one embodiment according to the present invention.
Figure 2:
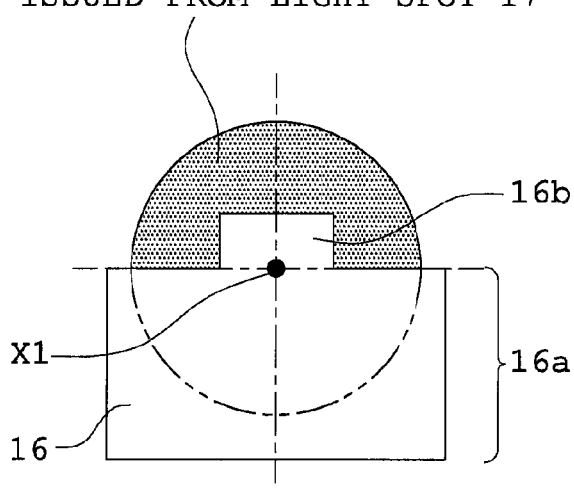
FIG. 2 is an explanatory diagram showing a shape of the first and second shading parts constituting the mask means, an area in which light is not shaded by the first and second shading parts in illumination light flux, and an area in which the light is shaded in the focus detecting apparatus equipped with the microscope observation apparatus of FIG. 1.
Figure 3:
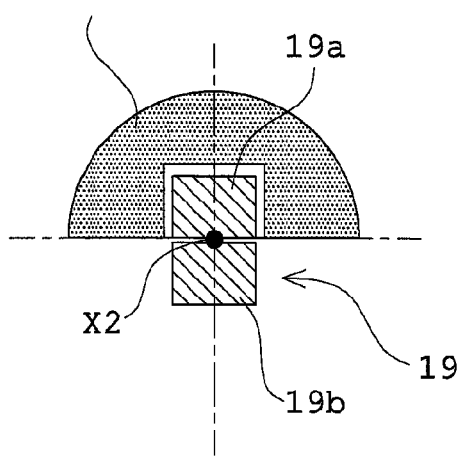
FIG. 3 is an explanatory diagram showing positional relationship between two light receiving parts of light reflected on a surface of a side which is an object of focusing in the transparent substrate and light reflected on a surface of a side which is not an object of focusing in the transparent substrate, with respect to the illumination light in the area which is not shaded by the first and second shading parts shown in FIG. 2.
Figure 4:
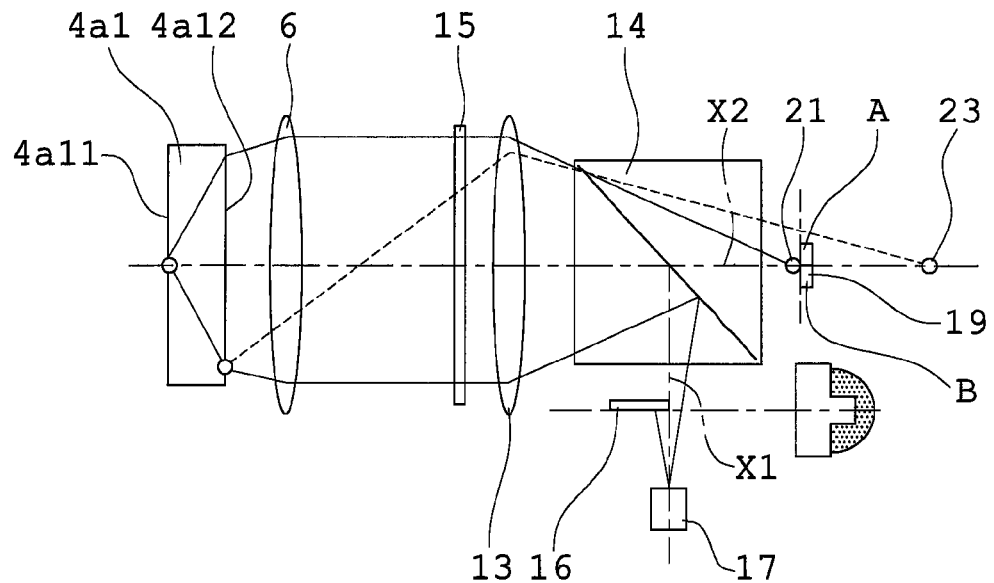
FIG. 4 is an explanatory diagram conceptually showing light paths of the light reflected on a surface of a side which is an object of focusing, and the light reflected on a surface of a side which is not an object of focusing, in case that focusing is carried out on a surface side to be detected of a sample (cell, etc.) held in a sample holder in the focus detecting apparatus of the present embodiment.
Figure 5:
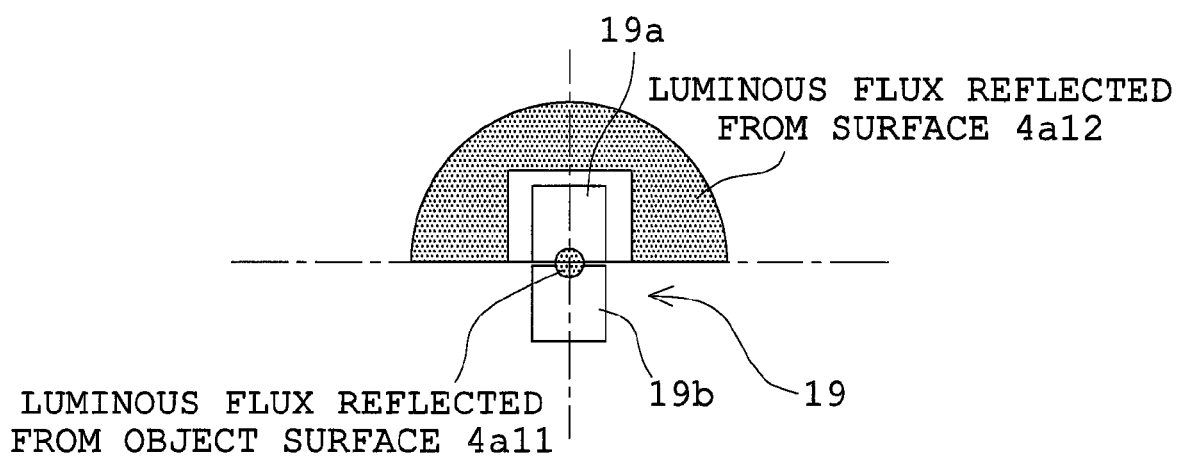
FIG. 5 is an explanatory diagram showing an incident state, in the vicinity of two light receiving parts, of each light reflected on the object side surface and the non object side surface, in the focus detecting apparatus in the state shown in FIG. 4.
Figure 6:
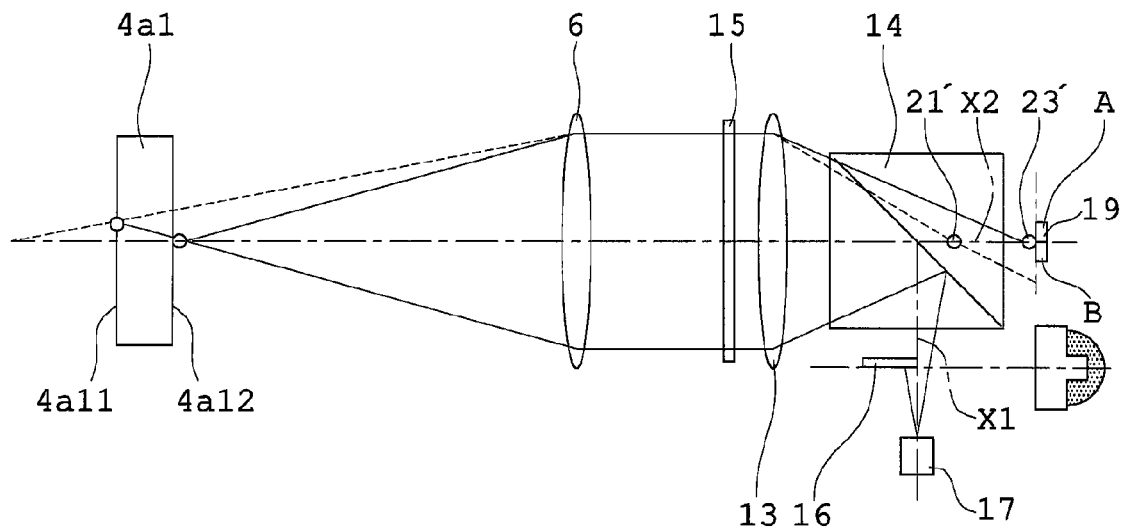
FIG. 6 is an explanatory diagram conceptually showing light paths of the light reflected on a surface of a side which is an object of focusing, and the light reflected on a surface of a side which is not an object of focusing, in case that focusing is carried out on a surface at an opposite side of an object to be detected in the sample holder, in the focus detecting apparatus according to the present embodiment.
Figure 7:
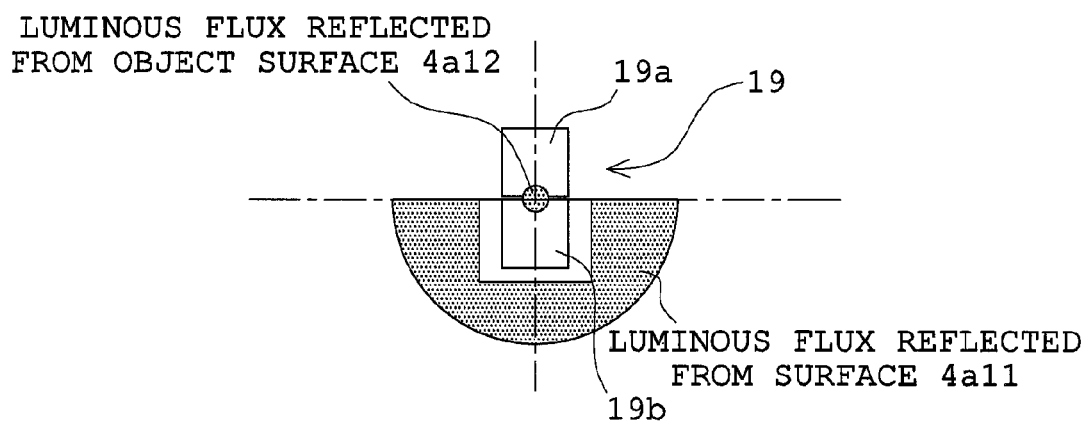
FIG. 7 is an explanatory diagram showing a state of incidence light to be reflected on each of surfaces in the vicinity of two light receiving parts of the light reflected on each of a surface of a side which is used as the object of focus detection and a surface of a side which is not used as an object of focus detection, in the sample holder, in the focus detecting apparatus a state of which is shown in FIG. 6.
Figure 8:
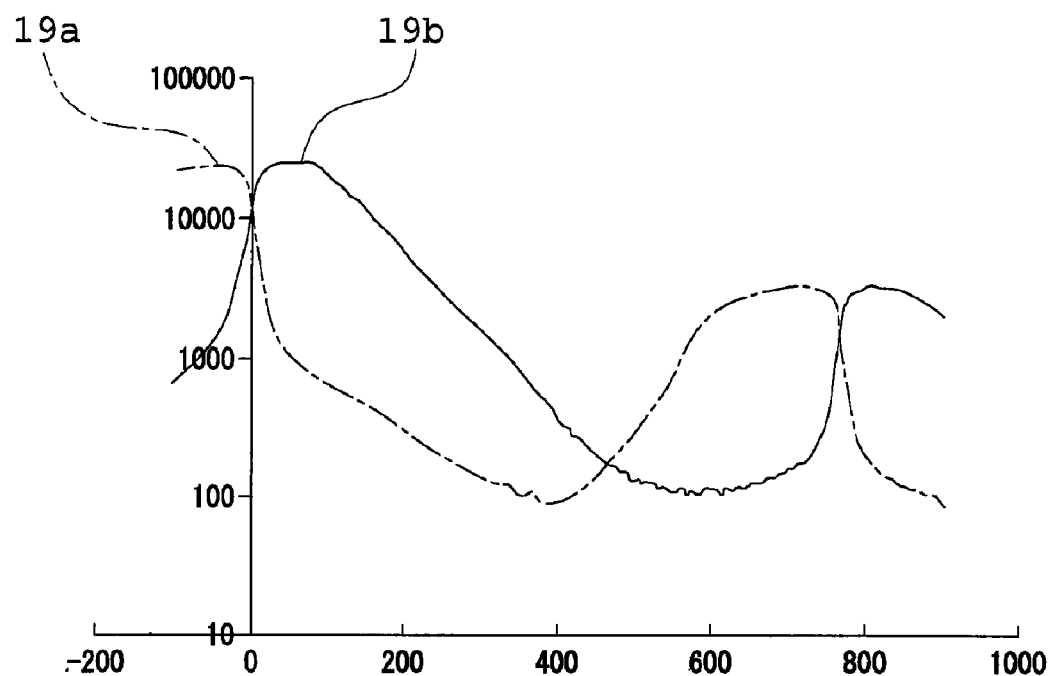
FIG. 8 is a diagrammatic chart showing one example of change of an amount of received light according to a focusing state, which is detected by two light receiving parts in the focus detecting apparatus according to the present embodiment.
Figure 9:
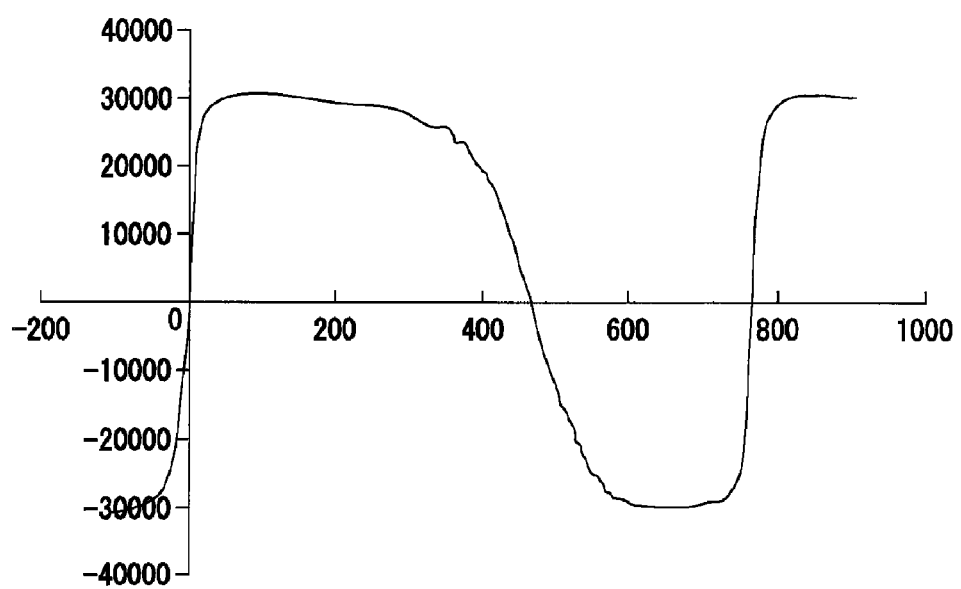
FIG. 9 is a diagrammatic chart showing one example of a value of evaluation function calculated based on the amount of received light detected by two light receiving parts shown in FIG. 8.

FIG. 1 is an explanatory diagram showing an outlined constitution of a microscope observation apparatus equipped with a focus detecting apparatus of one embodiment according to the present invention. FIG. 2 is an explanatory diagram showing a shape of the first and second shading parts constituting the mask means, an area in which light is not shaded by the first and second shading parts in illumination light flux, and an area in which the light is shaded in the focus detecting apparatus equipped with the microscope observation apparatus of FIG. 1. FIG. 3 is an explanatory diagram showing positional relationship between two light receiving parts of light reflected on a surface of a side which is an object of focusing in the transparent substrate and light reflected on a surface of a side which is not an object of focusing in the transparent substrate, with respect to the illumination light in the area which is not shaded by the first and second shading parts shown in FIG. 2. FIG. 4 is an explanatory diagram conceptually showing light paths of the light reflected on a surface of a side which is not an object of focusing, and the light reflected on a surface of a side which is an object of focusing in the transparent substrate, in case that focusing is carried out on a surface side to be detected on the transparent substrate in the focus detecting apparatus of the present embodiment. FIG. 5 is an explanatory diagram showing a state of incidence light reflected on each of the surfaces in the vicinity of two light receiving parts of the light reflected on each surface at a side used as the object of focus detection, and a side which is not used as an object of focus detection on the transparent substrate, in the focus detecting apparatus in a state shown in FIG. 4. FIG. 6 is an conceptual explanatory diagram showing, light paths of the light reflected on a surface of a side which is an object of focusing, and the light reflected on a surface of a side which is not an object of focusing in case that focusing is carried out on a surface at an opposite side of a sample in the transparent substrate, in the focus detecting apparatus according to the present embodiment. FIG. 7 is an explanatory diagram showing a state of incidence light reflected on each of surfaces in the vicinity of two light receiving parts of the light reflected on each of surfaces used as the object of focus detection, and a surface which is not used as an object of focus detection in the transparent substrate in the focus detecting apparatus a state of which is shown in FIG. 6. FIG. 8 is a diagrammatic chart showing one example of change of an amount of received light according to a focusing state, which is detected by two light receiving parts in the focus detecting apparatus according to the present embodiment. FIG. 9 is a diagrammatic chart showing one example of a value of evaluation function calculated based on the amount of received light detected by two light receiving parts shown in FIG. 8. Here, in FIGS. 4 and 6, for convenience of explanation, it is shown that position of a photodetector is replaced by a point light source and a mask means in the present invention. Further, a stray light blocking component mentioned later is also omitted.

The microscope observation apparatus equipped with a focus detecting apparatus of the present embodiment comprises, as shown in FIG. 1, a main body 1 of a microscope, an epi-illumination apparatus 2, and a focus detecting apparatus 3.

The main body 1 of the microscope has a XY stage 5 for mounting a sample holder 4. In the lower part of XY stage 5, an objective lens 6, half mirrors 7 and 20, an image forming lens 8, and a CCD camera 9 are provided. The XY stage 5 is constituted so that it may be moved on a horizontal plane (a plane which is perpendicular to the surface of drawing paper showing FIG. 1.). The objective lens 6 is constituted so as to be able to move in the direction of the optical axis.

As the sample holder 4 is used a microplate manufactured by light transmitting components such as polystyrene and having well-known plural well 4a in which a culture solution 4b, and a cell cultured in the culture solution 4b is fixed on the surface 4a11 of a bottom part 4a1 of the microplate by well-known technology. The bottom part 4a1 of the microplate corresponds to the transparent substrate in the present invention. The cell used for a sample may be a cell dyed by a adequate method according to an item to be analyzed further. Although the sample holder 4 made of plastics is illustrated here as a container to be used, a glass bottom plate in which glass is stuck on the bottom may be used.

The epi-illumination apparatus 2 is provided at the lower part of the XY stage 5 and consists of a light source 11 and a lens 12. The light source 11 consists of a white LED.

The focus detecting apparatus 3 comprises the objective lens 6, the half mirror 7, and a focus detecting unit 3'. The focus detecting unit 3' is arranged at a reflecting-light-optical path of the half mirror 7 in the main part 1 of the microscope, and it comprises a λ/4 plate 15, a lens 13, a polarizing beam splitter 14, a mask means 16, a point light source 17 for focusing arranged at a penetration-light-optical path of the polarizing beam splitter 14, a stray light blocking component 18 arranged at reflecting-light-optical path of the polarizing beam splitter 14, and a photo detector 19. The point light source 17 for focusing is constituted with a laser diode and adapted to emit the illumination light for generating a focusing signal to the transparent substrate of the sample holder 4 (the bottom part 4a1 of the microplate). The stray light blocking component 18 is arranged at one of areas which are divided at the second virtual plane (plane perpendicular to a plane which includes the optical axis X2 in FIG. 1) in alignment with the optical axis X2, in order to shade stray light that is deviated from a designated optical path, out of such light that passes through the mask means 16 mentioned later, that illuminates the bottom part 4a1 of the sample holder 4 via the objective lens 6, that is reflected by the bottom part 4a1, and that is transmitted toward the light detector 19. Here, the stray light blocking component 18 may be omitted when the stray light separated from the predetermined optical path hardly generates.

The photodetector 19 is a photodiode having two divided parts and has two light receiving parts 19a and 19b. Two light receiving parts 19a and 19b are symmetrically arranged across the virtual plane (plane which is perpendicular to a horizontal plane which includes the optical axis X2 in FIG. 1) in alignment with the optical axis X2.

The mask means 16 has the first shading part 16a and the second shading part 16b as shown in FIG. 2.

The first shading part 16a is constituted so that it may have a form and size for shading the luminous flux passing through one of the areas when it is divided by the first virtual plane (plane which is perpendicular to the horizontal plane which includes the optical axis X1 in FIG. 1), which is in alignment with the optical axis X1, out of the luminous flux of the illumination light emitted from the point light source 17. In the present embodiment, although the first shading part 16a is rectangle form, any kind of form may be used as long as it is a form which can shade the luminous flux of one of the portions.

The second shading part 16b is formed so as to have a shape similar to one of light receiving parts in the photodetector 19. And, it is constituted so that it may shade a part of luminous flux of light passing through the area of another side, when it is divided at the first virtual plane which is in alignment with the optical axis X1 out of the luminous flux of light of the illumination light emitted from the point light source 17, wherein it is constituted so that when the focus of the objective lens 6 is located near one of the surfaces out of the first or second surface (surface 4a11 or surface 4a12 of bottom part 4a1) on a transparent substrate (bottom part 4a1 of sample holder 4), reflected light from one of the surfaces may enters into the two light receiving parts 19a and 19b, and reflected light from another surface may pass through an area which is deviated from the light receiving part (light receiving part 19a in the example of FIG. 3) which is arranged at one of the areas when it is divided by the second virtual plane as shown in FIG. 3 for example.

In the microscope observation apparatus equipped with the focus detecting apparatus of the present embodiment constituted as mentioned above, firstly, light emitted from the white LED which is the light source 11 of the epi-illumination apparatus 2 is illuminated to the sample mounted on the XY stage 5 through the lens 12, the half mirror 20, the half mirror 7, and the objective lens 6. At this time, the light from the sample is led to CCD camera 9 via the objective lens 6, the half mirror 7, the half mirror 20, and the lens 8. Thereby, an image of the sample can be formed on CCD camera 9.

In the focus detecting apparatus 3, a part of light emitted from the laser diode 17 is shaded through the mask means 16. On the other hand, light which passed through without being shaded by the mask means 16, is led to the sample holder 4 via the polarizing beam splitter 14, the lens 13, the λ/4 plate 15, the half mirror 7, and the objective lens 6. At this time, the reflected light from the sample holder 4 is led to the light receiving element 19 via the objective lens 6, the half mirror 7, the λ/4 plate 15, the lens 13, and the polarizing beam splitter 14.

Here, in the focus detecting apparatus 3, a state of the reflected light entering into the light receiving element 19 from the bottom part 4a1 of the sample holder 4 changes as follows in a relation between the surface position of the bottom part 4a1, and the focal position of the objective lens 6.

First, in a case that focusing of the objective lens 6 is carried out on the surface 4a11 at the side where it touches a culture solution 4b and the sample i.e. cell in the bottom part 4a1 (hereafter, a surface on which focusing of the objective lens 6 is carried out is called "object surface"), it follows an optical path of the focus detecting apparatus 3 as shown in FIG. 4 when the focus position of the objective lens 6 is located near the object surface 4a11.

Namely, light reflected by the object surface 4a11 out of the light which is emitted from the laser diode 17 and is reflected by the bottom part 4a1 of the sample holder 4 passes through the objective lens 6, and then its image is formed on the image point 21 on the dual sensor type photodetector which is the light receiving element 19. On the other hand, an image of the light reflected by the surface 4a12 which is faced to the object surface 4a11 is formed at an image point 23 that is located at more distant from the image point 21.

Here, in the focus detecting apparatus 3 of the present embodiment, the second shading part 16b of the mask means 16 is formed so as to have a shape similar to one 19b of light receiving parts in the photodetector 19. And it is constituted so that when the focus of the objective lens 6 is located near one of the object surfaces, the reflected light from one of the surfaces may enter into the two light receiving parts 19a and 19b, and further the reflected light from another surface, as shown in FIG. 3, may pass through the area which is deviated from the light receiving part (light receiving part 19a in the example of FIG. 3) which is arranged at one of the areas when it is divided by the second virtual plane. Accordingly, it is constituted so as to shade a part of luminous flux of light passing through the area of another side, when it is divided at the first virtual plane which is in alignment with the optical axis X1 out of the luminous flux of light of the illumination light emitted from the point light source 17.

Therefore, as shown in FIG. 5, the light reflected by the object surface 4a11, is condensed in almost nearly point shape, and enters into the dual sensor type photodetector, and then the same amount of light is detected by the light receiving parts 19a and 19b of the dual sensor type photodetector. On the other hand, the light reflected by the surface 4a12 goes toward the dual sensor type photodetector in a state without forming image. However, light from an area which may enter into the dual sensor type photodetector out of the light which is emitted from the point light source 17 and may be reflected on the surface 4a12, is shaded by the second shading part 16b of the mask means 16, and accordingly, it is not reflected by the surface 4a12. Thus, all the light reflected by the surface 4a12 passes through a position which is deviated from the dual sensor type photodetector.

On the other hand, in a case that focusing of the objective lens 6 is carried out on the surface 4a12 which is opposite to the side where it touches the culture solution 4b and the cell in the bottom part 4a1, when the focus position of the objective lens 6 is located near the object surface 4a12, it follows an optical path of the focus detecting apparatus 3 as shown by real lines in FIG. 6. Namely, light reflected by the object surface 4a12 out of the light which is emitted from the laser diode 17 and is reflected by the bottom part 4a1 of the sample holder 4 passes through the objective lens 6, and then its image is formed on an image point 23' on the dual sensor type photodetector that is the light receiving element 19. On the other hand, an image of the light reflected by the surface 4a11 which is faced to the object surface 4a12 is formed at an image point 21' that is nearer than the image point 23'.

Here, in the focus detecting apparatus 3 of the present embodiment, the second shading part 16b of the mask means 16 is formed in a similar shape to one of light receiving parts in the photodetector 19. And it is constituted so that when the focus of the objective lens 6 is located near one surface (4a12), reflected light from the one surface may enter into the two light receiving parts 19a and 19b, and further reflected light from another surface (4a11) may pass through the area which is deviated from the light receiving part (light receiving part 19b in the example of FIG. 7) which is arranged at one of the areas when it is divided by the second virtual plane, as shown in FIG. 7, for example. Accordingly, it is constituted so as to shade a part of luminous flux of light passing through the area of another side when it is divided at the first virtual plane which is in alignment with the optical axis X1 out of the luminous flux of light of the illumination light emitted from the point light source 17.

Further, the mask means 16 may be formed to be variable in its shape, and the first and second shading parts may be constituted by combining two thin plates. The freedom of design of the whole apparatus can be increased by constituting the mask means as mentioned above.

Therefore, as shown in FIG. 7, light reflected by the object surface 4a12 is condensed in almost nearly point shape, and enters into the dual sensor type photodetector, and then the same quantity of light is detected by the light receiving parts 19a and 19b of the dual sensor type photodetector. On the one hand, the light reflected by the surface 4a11 goes toward the dual sensor type photodetector in a state without forming image, but light in an area which may enter into the dual sensor type photodetector out of the light which is emitted from the point light source 17, and reflected on the surface 4a11 is shaded by the second shading part 16b of the mask means 16, and it is not reflected by the surface 4a11. Accordingly, all the light reflected on the surface 4a11 passes through a position which is deviated from the dual sensor type photodetector.

In this way, the dual sensor type photodetector 19 which receives only the reflected light from the object surface of the examination object catches information of an amount of the reflected light, and outputs it to a known control part (not illustrated) as a focusing signal. Then, the control part calculates evaluation function that is $(A-B)/(A+B)$ on the basis of the focusing signal. An example of change of the amount of the light detected by the dual sensor type photodetector in the focus detecting apparatus of the present embodiment is shown in the diagrammatic chart of FIG. 8. Moreover, an example of a calculated value of the evaluation function performed on the basis of the data of FIG. 8 is shown in the diagrammatic chart in FIG. 9. In the diagrammatic chart of FIG. 9, the horizontal axis shows a relative distance between the sample holder 4 and the objective lens, and the vertical axis shows an evaluated value of focusing. In focusing, the objective lens 6 is moved up and down through the actuator 10 so that this calculated value of the evaluation function becomes 0. When the objective lens 6 is moved to a position where the calculated value of the evaluation function becomes 0, the focus of the objective lens 6 is located on the object surface of the sample holder 4, and focusing is achieved.

In the present embodiment, a case that focusing is carried out on a surface of the inner side of the transparent container such as a microplate and the like which is the sample holder 4 has been described. However, even in a case that a reflective surface to be a noise is positioned at the other side over the object surface when focusing is carried out on a surface such as a glass slide etc., the focusing can be carried out by adjusting size of the shading member.

As described above, according to the focus detecting apparatus of the present embodiment, the reflected light from a surface side which is not an object surface at the bottom part of the sample holder can be eliminated by the mask means 16. Therefore, only the light which is emitted from the illumination light source and reflected from the object surface can be reflected at the object surface. Accordingly, highly precise focusing can be carried out without giving unfavorable influence on a focusing signal by stray light emitted from surfaces which are not object surfaces.

Furthermore, according to the focus detecting apparatus of the present embodiment, by using a point light source as an illuminating light source, the number of components for constituting the optical system for focusing can be small.

The present invention is useful for fields where it is required that images of many cells are acquired using the automated microscopic observation apparatus, and a statistics analysis result is obtained by analyzing the acquired images.

What is claimed is:

1. A focus detecting apparatus for focusing on a transparent substrate having two surfaces, the focus detecting apparatus comprising:

an objective lens;

a point light source which emits illumination light for generating a focusing signal to the transparent substrate and irradiates the transparent substrate through the objective lens;

mask means having a first shading part, the first shading part being configured to shade, out of luminous flux of the illumination light emanating from the point light source, luminous flux passing through one of two regions into which a space is divided by a first virtual plane, the first virtual plane being a plane in which an optical axis for the illumination light lies; and a photodetector, having two light receiving parts that are symmetrically arranged to sandwich a second virtual plane, for carrying out focusing of the objective lens on one of the two surfaces of the transparent substrate based on amounts of reflecting light from the transparent substrate that are detected through the two light receiving parts, respectively, the second virtual plane being a plane in which an optical axis for light reflecting from the transparent substrate lies;

wherein the mask means further includes a second shading part, having a shape similar to one of the two light receiving parts of the photodetector, for intercepting, out of the luminous flux of the illumination light emanating from the point light source, a part of luminous flux passing through another of the two regions defined by division of the space by the first virtual plane so that, when a focus of the objective lens is positioned near one of the surfaces of the transparent substrate, reflected light from the one transparent substrate surface, which is positioned near the focus of the objective lens, enters the two light receiving parts, and reflected light from the other transparent substrate surface passes through an area off one of the light receiving parts arranged in one of two regions into which a space is divided by the second virtual plane.

2. The focus detecting apparatus according to claim 1, wherein the mask means is deformable.

3. The focus detecting apparatus according to claim 2, wherein the first shading part and the second shading part of the mask means are constituted with combination of two thin plates.

* * * * *